United States Patent
Linke et al.

(10) Patent No.: US 7,871,259 B2
(45) Date of Patent: Jan. 18, 2011

(54) METHOD AND DEVICE FOR BLOW-MOLDING CONTAINERS

(75) Inventors: Michael Linke, Hamburg (DE); Michael Litzenberg, Geesthacht (DE); Rolf Baumgarte, Ahrensburg (DE); Frank Lewin, Tangstedt (DE); Julian Choinski, Hamburg (DE)

(73) Assignee: KHS Corpoplast GmbH & Co. KG, Hamburg (DE)

( * ) Notice: Subject to any disclaimer, the term of this patent is extended or adjusted under 35 U.S.C. 154(b) by 0 days.

(21) Appl. No.: 11/989,443

(22) PCT Filed: Jul. 17, 2006

(86) PCT No.: PCT/DE2006/001270

§ 371 (c)(1),
(2), (4) Date: Mar. 11, 2008

(87) PCT Pub. No.: WO2007/012309

PCT Pub. Date: Feb. 1, 2007

(65) Prior Publication Data

US 2009/0039567 A1     Feb. 12, 2009

(30) Foreign Application Priority Data

Jul. 23, 2005  (DE) .................. 10 2005 034 541

(51) Int. Cl.
*B29C 49/38* (2006.01)
*B29C 49/56* (2006.01)

(52) U.S. Cl. .................. 425/526; 425/539; 425/540; 425/541

(58) Field of Classification Search .................. 425/526, 425/539, 540, 538, 541
See application file for complete search history.

(56) References Cited

U.S. PATENT DOCUMENTS

| | | | | |
|---|---|---|---|---|
| 1,944,866 A | * | 1/1934 | Peiler | 65/73 |
| 7,708,549 B2 | * | 5/2010 | Stoiber et al. | 425/534 |
| 2004/0151797 A1 | * | 8/2004 | Mue et al. | 425/450.1 |
| 2005/0238753 A1 | * | 10/2005 | Arakelyan et al. | 425/540 |

FOREIGN PATENT DOCUMENTS

| | | |
|---|---|---|
| DE | 23 52 926 | 4/1975 |
| DE | 42 12 583 | 10/1993 |
| DE | 43 40 291 | 6/1995 |
| DE | 199 48 474 | 4/2001 |
| DE | 202004017530 U1 * | 4/2005 |
| DE | 103 46 089 | 5/2005 |
| EP | 1520681 A1 * | 4/2005 |
| FR | 2843714 A1 * | 2/2004 |

* cited by examiner

*Primary Examiner*—Joseph S Del Sole
*Assistant Examiner*—Ryan Ochylski
(74) *Attorney, Agent, or Firm*—Lucas & Mercanti, LLP; Klaus P. Stoffel

(57) ABSTRACT

The invention relates to a method and a device for blow-moulding containers from preforms which are previously heated in the region of a heating section and consist of a thermoplastic material. The preforms are transferred to a blowing device following the heating thereof, in which they are shaped to form containers by the application of a blowing pressure inside blow moulds. Said blow moulds respectively consist of at least two blow mould segments. The preforms are transported together with the blow moulds at least along part of a peripheral path of a rotating blow wheel. A separating plane of the blow mould segments is positioned at least in an opened state of the blow station in a rotational direction of the blow wheel, facing forwards, with an angle of inclination in relation to the radial direction of the blow wheel. The blow station is positioned at least in two parts during a transfer process.

11 Claims, 6 Drawing Sheets

METHOD AND DEVICE FOR BLOW-MOLDING CONTAINERS

BACKGROUND OF THE INVENTION

The invention concerns a method for blow molding containers, in which preforms made of a thermoplastic material are heated in a heating line and then transferred to a blowing system, in which the preforms are shaped into containers by the action of blowing pressure inside blow molds, which consist of at least two blow mold segments, and in which method the preforms are conveyed together with the blow molds along at least part of a peripheral path of a rotating blowing wheel.

The invention also concerns a device for blow molding containers, which has a heating line for heating preforms made of a thermoplastic material and is provided with a blowing system, which has at least one blowing station arranged on a blowing wheel for shaping the preforms into containers, and in which the blowing station is provided with mold supports for supporting each blow mold segment.

In container molding of this type by the action of blowing pressure, preforms made of a thermoplastic material, for example, preforms made of PET (polyethylene terephthalate), are fed to different treatment stations within a blow-molding machine. A blow-molding machine of this type typically has a heating system and a blowing system, in which the preform, which has first been brought to a desired temperature, is expanded into a container by biaxial orientation. The expansion is effected by means of compressed air, which is fed into the preform to be expanded. DE-OS 43 40 291 explains the process-engineering sequence in this type of preform expansion.

The basic design of a blowing station for container molding is described in DE-OS 42 12 583. Possible means of bringing the preform to the desired temperature are explained in DE-OS 23 52 926.

Various handling devices can be used to convey the preforms and the blow-molded containers within the blow-molding device. The use of transport mandrels, onto which the preforms are slipped, has proven especially effective. However, the preforms can also be handled with other supporting devices. Other available designs include the use of gripping tongs for handling the preforms and the use of expanding mandrels, which can be inserted in the mouth section of the preform to support the preform.

The above-explained handling of the preforms occurs, for one thing, in so-called two-step processes, in which the preforms are first produced by injection molding and temporarily stored and then later conditioned with respect to their temperature and blown into containers. For another, the preforms can be handled in so-called one-step processes, in which the preforms are first produced by injection molding and allowed to solidify sufficiently, then immediately suitably conditioned with respect to their temperature, and then blow molded.

With respect to the blowing stations that are used, various embodiments are known. In the case of blowing stations that are arranged on rotating transport wheels, book-like opening of the mold supports is often encountered. However, it is also possible to use mold supports that can be moved relative to each other or that are guided in a different way. In stationary blowing stations, which are suitable especially for accommodating several cavities for container molding, plates arranged parallel to one another are typically used as mold supports.

As a result of steadily increasing demands on the productivity of blow-molding machines, blowing wheels are used which rotate relatively fast and have a relatively large number of blowing stations. The large number of blowing stations results in blowing wheels with large diameters, and the high speeds of rotation result in large braking and accelerating forces due to the high kinetic energy of the moving masses.

To diminish these negative effects, it has already been proposed that the blowing wheels be designed with a compact arrangement of blowing stations. DE-OS 199 48 474 describes a large number of design variations. However, so far no design has been found that allows improved compactness of the blowing wheel and at the same time allows a simple basic mechanical design.

DE-OS 103 46 089.6 describes the arrangement of blowing stations on a rotating blowing wheel, in which a parting plane of the blow mold segments is oriented obliquely backward opposite the direction of movement of the blowing wheel. To carry out feeding and delivery operations, the two blow mold segments are swung open to allow access to the inside of the blowing station.

SUMMARY OF THE INVENTION

The objective of the present invention is to improve a method of the aforementioned type in a way that helps to optimize the kinematic sequences of the blow-molding machine.

In accordance with the invention, this objective is achieved by virtue of the fact that, at least in an opened state of the blowing station, a parting plane of the blow mold segments, which is directed obliquely forward in the direction of rotation of the blowing wheel at an angle of inclination relative to the radial direction of the blowing wheel, is moved, at least intermittently during a transfer operation, in a peripheral direction of the blowing wheel.

A further objective of the invention is to design a device of the aforementioned type in such a way that a compact and inexpensive design of the blowing wheel is obtained with improved distribution of the rotating masses.

In accordance with the invention, this objective is achieved by virtue of the fact that, at least in an opened state of the blowing station, at least one parting plane of the blow mold segments is positioned in such a way that it is directed obliquely forward in the direction of rotation of the blowing wheel at an angle of inclination relative to the radial direction of the blowing wheel.

The arrangement of the blowing station with the parting plane directed obliquely forward in the direction of rotation of the blowing wheel means that the outer part of the parting plane relative to the center of the blowing wheel is in a leading position relative to the part of the parting plane that is located farther inward relative to the center of the blowing wheel. Although this arrangement results in more complicated kinematics when feeding and discharge operations are being carried out, the distance between two blowing stations can be significantly reduced compared to the prior art, since the blow mold segments do not swing open laterally, but rather the swiveling movement is carried out with a radial component. In particular, the blow mold segment that is located farther inward relative to the other blow mold segment can be rotated towards the center of the blowing wheel.

The basic handling disadvantage during the performance of feeding and discharge operations due to the oblique position of the parting plane is compensated to a considerable extent by the fact that the inclination of the parting plane, as viewed from the outside, is directed forward in the direction of movement of the blowing wheel. In this connection, it was taken into consideration that the feeding of the relatively small preforms is simple due to their small outer volume, whereas the discharge of the blow-molded containers is complicated due to their larger outer volume. Due to the inclination of the parting plane on the outside, which is directed obliquely forward, compared to discharge in a radial direction, the discharge of the large containers is made easier by the fact that the discharge movement and the direction of movement of the blowing wheel are superimposed, and the feeding of the relatively small preforms is made more complicated. With the use, for example, of rotating and telescoping transfer devices, this means that the advantages and disadvantages of the feeding and discharge operations compensate each other, so that, as a result, there are no significant overall disadvantages to offset the significantly more compact design of the blowing wheel.

It is conducive to simple controllability if the clamping of the blow mold segments relative to each other is produced by pneumatic clamping.

To help realize simple kinematics while carrying out the feeding of the preforms and the removal of the containers, it is proposed that the blowing station be arranged in such a way with a parting plane of the blow mold segments that, in a closed state of the blowing station, the parting plane is positioned obliquely to a radial reference plane of the blowing wheel.

In particular, it is found to be effective with respect to material handling if the mold support that is rigidly connected with the blowing wheel is arranged obliquely to the radial reference plane.

In a preferred embodiment, a hinge pin of a moving blow mold segment is arranged essentially vertically.

Simple revolution of material is more easily realized if the blowing station is designed to hold preforms with their mouth sections oriented vertically upward.

However, it is also possible for the blowing station to be designed to hold preforms with their mouth sections oriented vertically downward.

A high degree of modularity of the overall design can be realized if mold supports that are rigidly connected with the blowing wheel and mold supports that can move relative to the blowing wheel are alternately positioned along the outer periphery of the blowing wheel.

A compact design, combined with good accessibility, can be realized if the blow mold segment that is arranged more towards the outside with respect to the radial direction of the blowing wheel is stationary relative to the blowing wheel and is conveyed by the blowing wheel.

It is conducive to a stable design if the positioning of the one or more blow mold segments is carried out with the use of a toggle mechanism.

A good compromise between a compact design and good accessibility is obtained if the angle of inclination in a closed state of the blowing station is set in an angular range of 10-40° relative to the radial reference plane.

In particular, it is proposed that the angle of inclination relative to the radial reference plane be set at an inclination of about 20-30°.

It has been found to be especially advantageous if the angle of inclination relative to the radial reference plane is set at an inclination of about 25°.

BRIEF DESCRIPTION OF THE DRAWING

Specific embodiments of the invention are schematically illustrated in the drawings.

DETAILED DESCRIPTION OF THE INVENTION

Figure 1:
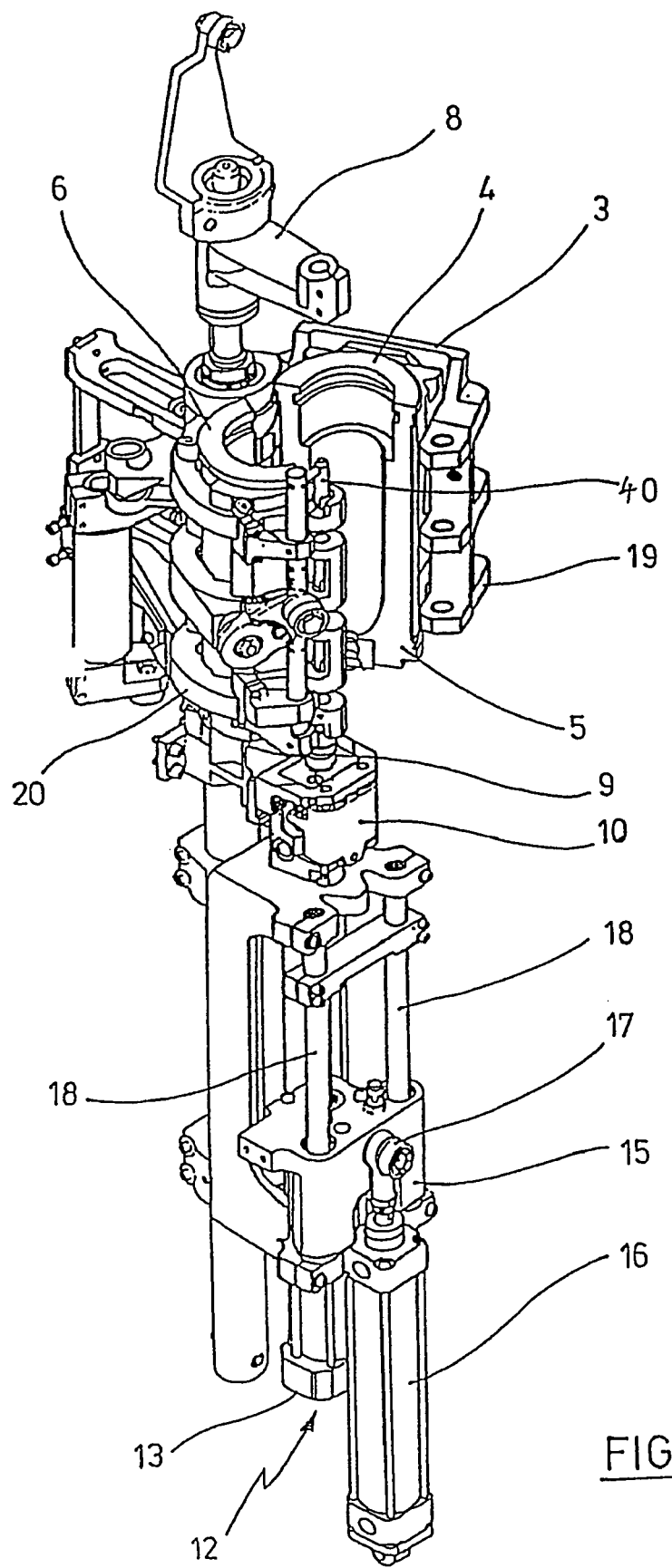
FIG. 1 shows a perspective view of a blowing station for producing containers from preforms.
Figure 2:
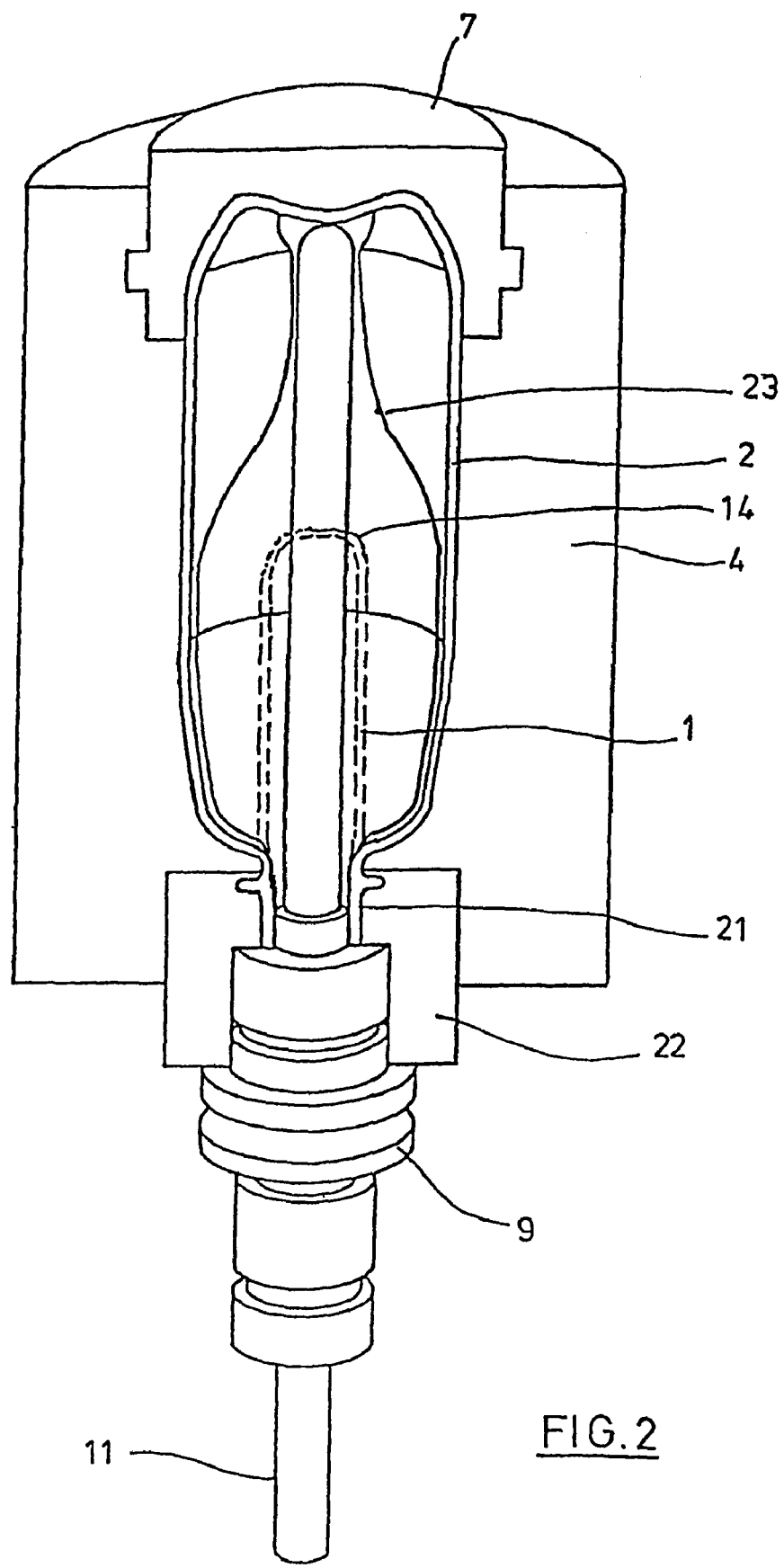
FIG. 2 shows a longitudinal section through a blow mold, in which a preform is stretched and expanded.

FIGS. 1 and 2 show the basic design of a device for shaping preforms 1 into containers 2.

The device for molding the container 2 consists essentially of a blowing station 3, which is provided with a blow mold 4, into which a preform 1 can be inserted. The preform 1 can be an injection-molded part made of polyethylene terephthalate. To allow a preform 1 to be inserted into the blow mold 4 and to allow the finished container 2 to be removed, the blow mold 4 consists of mold halves 5, 6 and a base part 7, which can be positioned by a lifting device 8. The preform 1 can be held in place in the area of the blowing station 3 by a transport mandrel 9, which, together with the preform 1, passes through a large number of treatment stations within the device. However, it is also possible to insert the preform 1 directly into the blow mold 4, for example, with tongs or other handling devices.

To allow compressed air to be fed in, a connecting piston 10 is arranged below the transport mandrel 9. It supplies compressed air to the preform 1 and at the same time produces a seal relative to the transport mandrel 9. However, in a modified design, it is also basically possible to use stationary compressed air feed lines.

The preform 1 is stretched by means of a stretch rod 11, which is positioned by a cylinder 12. In principle, however, it is also possible to position the stretch rod 11 mechanically by means of cam segments, which are acted upon by pickup rollers. The use of cam segments is advantageous especially when a large number of blowing stations 3 is arranged on a rotating blowing wheel. The use of cylinders 12 is advantageous when stationary blowing stations 3 are provided.

In the embodiment illustrated in FIG. 1, the stretching system is designed in such a way that a tandem arrangement of two cylinders 12 is provided. Before the start of the actual stretching operation, the stretch rod 11 is first moved into the area of a base 14 of the preform 1 by a primary cylinder 13. During the stretching operation itself, the primary cylinder 13 with the stretch rod extended, together with a carriage 15 that carries the primary cylinder 13, is positioned by a secondary cylinder 16 or by means of cam control. In particular, it is proposed that the secondary cylinder 16 be used in such a way under cam control that a current stretching position is predetermined by a guide roller 17, which slides along a cam track while the stretching operation is being carried out. The guide roller 17 is pressed against the guide track by the secondary cylinder 16. The carriage 15 slides along two guide elements 18.

After the mold halves 5, 6, which are arranged in the area of supports 19, 20, are closed, the supports 19, 20 are locked relative to each other by means of a locking mechanism 40.

To adapt to different shapes of a mouth section 21 of the preform 1, provision is made for the use of separate threaded inserts 22 in the area of the blow mold 4, as shown in FIG. 2.

In addition to the blow-molded container 2, FIG. 2 shows the preform 1, which is drawn with broken lines, and also shows schematically a container bubble 23 in the process of development.

Figure 3:
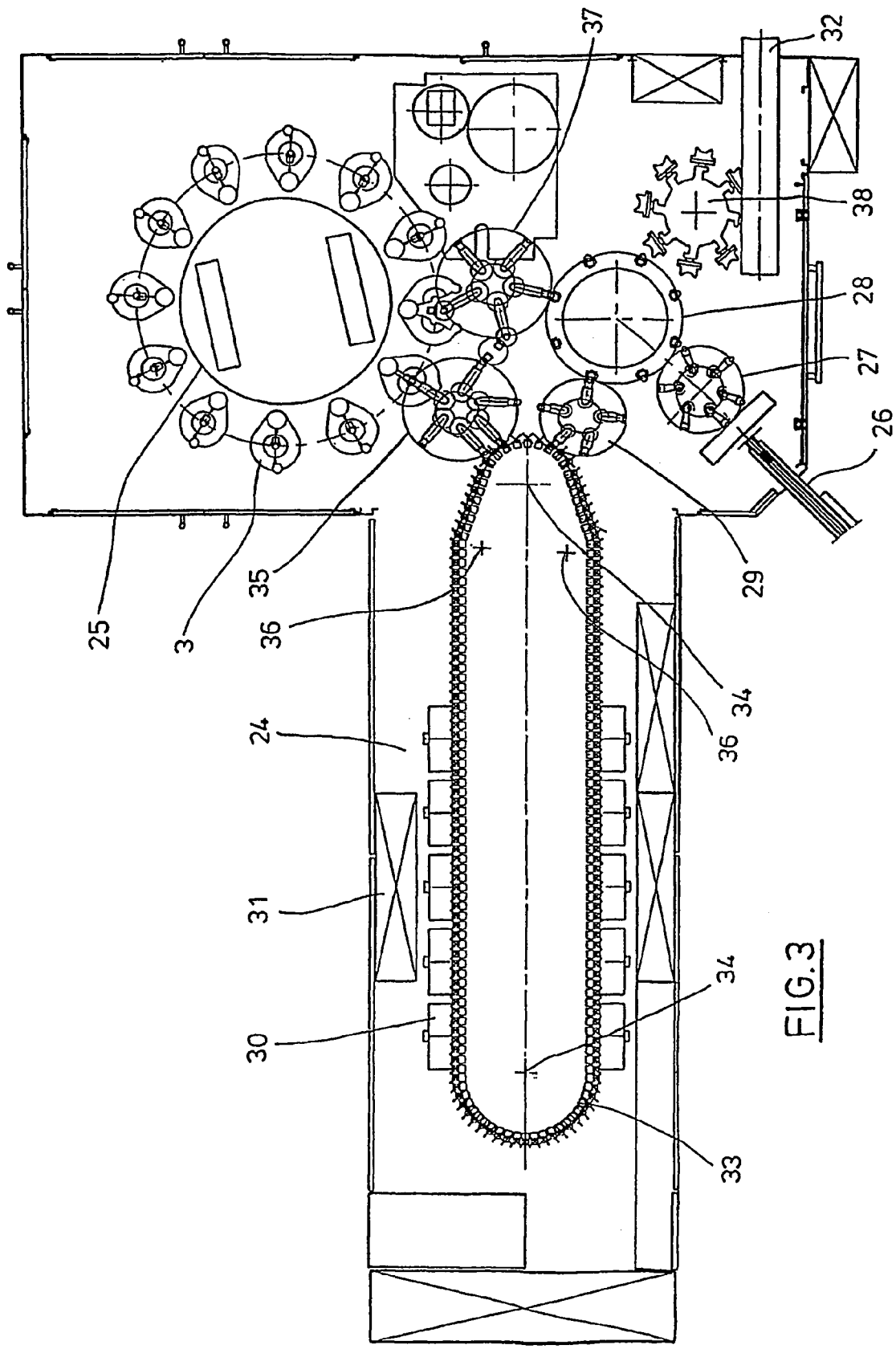
FIG. 3 shows a drawing that illustrates a basic design of a device for blow molding containers.

FIG. 3 shows the basic design of a blow-molding machine, which has a heating line 24 and a rotating blowing wheel 25. Starting from a preform feeding device 26, the preforms 1 are conveyed to the area of the heating line 24 by transfer wheels 27, 28, 29. Radiant heaters 30 and fans 31 are arranged along the heating line 24 to bring the preforms 1 to the desired temperature. After sufficient heat treatment of the preforms 1, they are transferred to the blowing wheel 25, where the blowing stations 3 are located. The finished blow-molded containers 2 are fed to a delivery line 32 by additional transfer wheels.

To make it possible for a preform 1 to be blow molded into a container 2 in such a way that the container 2 has material properties that ensure a long shelf life of the foods, especially beverages, with which the container 2 is to be filled, specific process steps must be followed during the heating and orientation of the preforms 1. In addition, advantageous effects can be realized by following specific dimensioning specifications.

Various plastics can be used as the thermoplastic material. For example, PET, PEN, or PP can be used.

The preform 1 is expanded during the orientation process by feeding compressed air into it. The operation of supplying compressed air is divided into a preblowing phase, in which gas, for example, compressed air, is supplied at a low pressure level, and a subsequent main blowing phase, in which gas is supplied at a higher pressure level. During the preblowing phase, compressed air with a pressure in the range of 10 bars to 25 bars is typically used, and during the main blowing phase, compressed air with a pressure in the range of 25 bars to 40 bars is supplied.

FIG. 3 also shows that in the illustrated embodiment, the heating line 24 consists of a large number of revolving transport elements 33, which are strung together like a chain and are moved along by guide wheels 34. In particular, it is proposed that an essentially rectangular basic contour be set up by the chain-like arrangement. In the illustrated embodiment, a single, relatively large-sized guide wheel 34 is used in the area of the extension of the heating line 24 facing the transfer wheel 29 and a feed wheel 35, and two relatively small-sized guide wheels 36 are used in the area of adjacent deflections. In principle, however, any other types of guides are also conceivable.

To allow the closest possible arrangement of the transfer wheel 29 and the feed wheel 35 relative to each other, the illustrated arrangement is found to be especially effective, since three guide wheels 34, 36 are positioned in the area of the corresponding extension of the heating line 24, namely, the smaller guide wheels 36 in the area of the transition to the linear stretches of the heating line 24 and the larger guide wheel 34 in the immediate area of transfer to the transfer wheel 29 and to the feed wheel 35. As an alternative to the use of chain-like transport elements 33, it is also possible, for example, to use a rotating heating wheel.

After the blow molding of the containers 2 has been completed, the containers 2 are carried out of the area of the blowing stations 3 by an extraction wheel 37 and conveyed to the delivery line 32 by the transfer wheel 28 and a delivery wheel 38.

Figure 4:
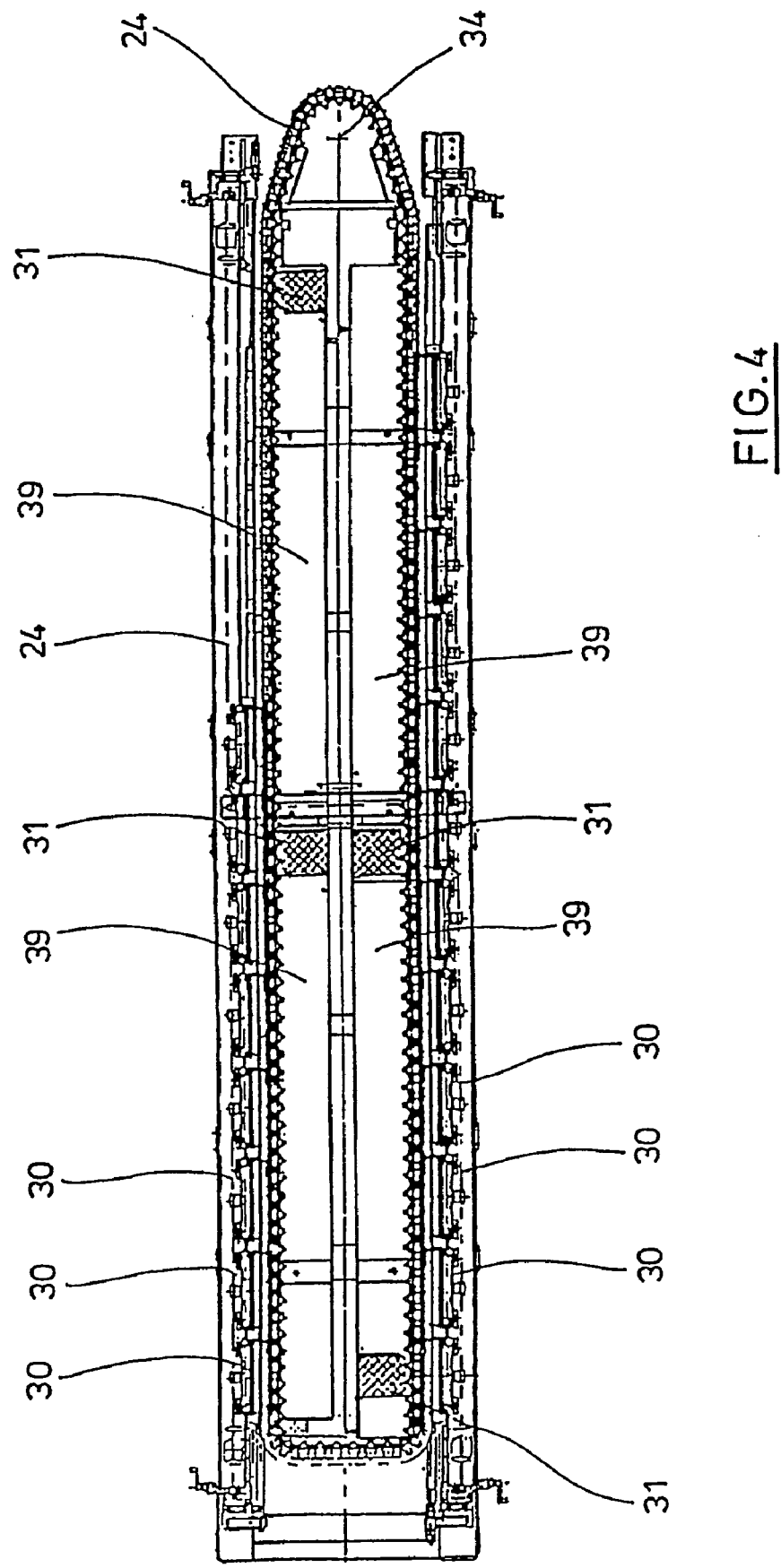
FIG. 4 shows a modified heating line with increased heating capacity.

In the modified heating line 24 illustrated in FIG. 4, a larger number of preforms 1 can be heated per unit time due to the larger number of radiant heaters 30. The fans 31 in this case feed cooling air into the area of cooling air ducts 39, which lie opposite the associated radiant heaters 30 and deliver the cooling air through discharge ports. A direction of flow of the cooling air essentially transverse to the direction of conveyance of the preforms 1 is realized by the arrangement of the discharge directions. In the area of surfaces opposite the radiant heaters 30, the cooling air ducts 39 can provide reflectors for the thermal radiation. It is also possible to realize cooling of the radiant heaters 30 by the delivered cooling air.

Figure 5:
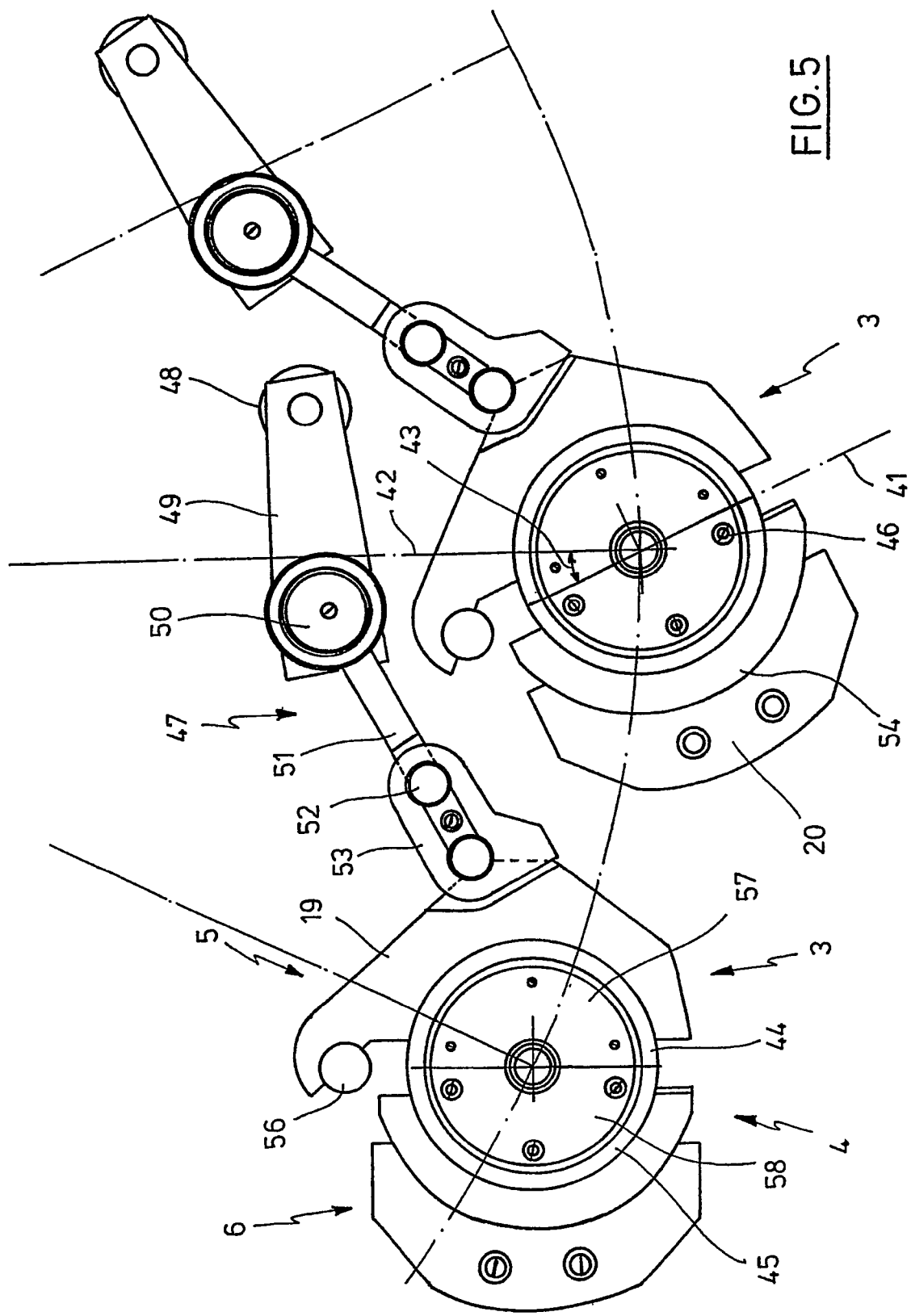
FIG. 5 shows a partial top view of a blowing wheel with several blowing stations arranged side by side in a completely opened state.

In the embodiment illustrated in FIG. 5, a plurality of blowing stations 3 is arranged along the circumference of the blowing wheel 25. The mold halves 5 are mounted in such a way that they can rotate about a hinge pin 56, and the mold halves 6 are rigidly connected with the blowing wheel 25. A parting plane 41 of the blowing station 3 is inclined relative to a radial reference plane 42 of the blowing wheel 25 by an angle of inclination 43.

In accordance with the design in FIG. 5, the blow molds consist of outer mold shells 44, 45 and inner mold shells 57, 58, which have the contour of the container 2 that is to be produced. The outer mold shells 44, 45 have channels 46 for a medium for heating or cooling the blow mold 4, depending on the given application.

Figure 6:
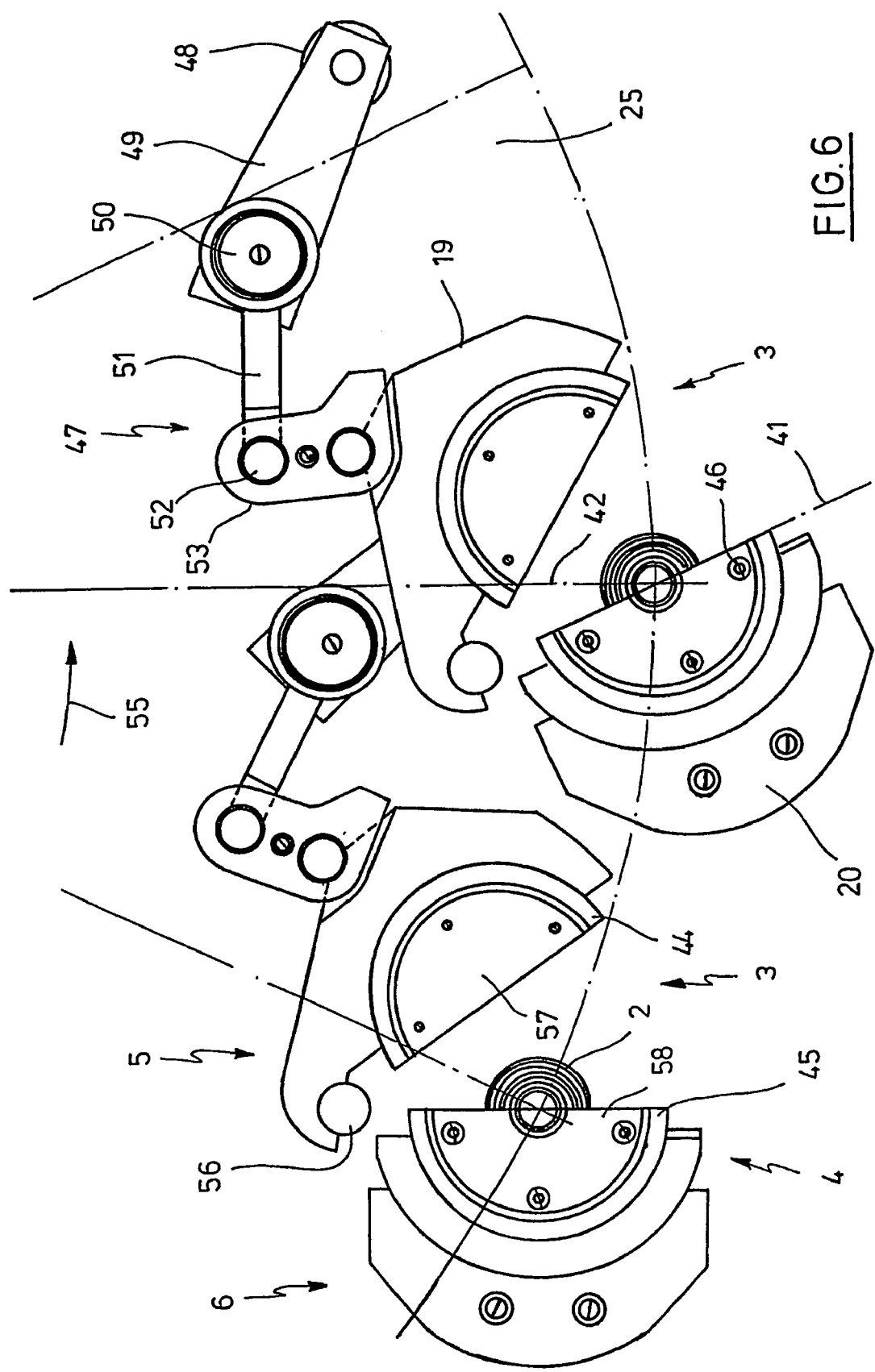
FIG. 6 shows the arrangement according to FIG. 5 after the blowing stations have been partially closed.

In the operating state of the blowing station 3 that is shown in FIG. 6, in which the blowing station 3 is opened to the maximum extent, the mold supports 19 of one blowing station 3 abut the mold supports 20 of the adjacent blowing station 3 or they are positioned only a very small distance from the adjacent mold supports. A positioning movement of the rotatable mold supports 19 is carried out by means of a positioning mechanism 47, which is preferably operated under cam control. A cam control mechanism not shown in FIG. 5 and FIG. 6 is connected by a camshaft 48 with an articulated link 49, which is coupled by a swivel joint 50 with a control lever 51. The control lever 51 is connected by a swivel joint 52 with a support lever 53.

Returning to the closed operating state of the blowing station 3 that is illustrated in FIG. 5, we see that a center line of the control lever 51 runs essentially through center points of the swivel joint 52 and swivel joint 50. This provides a simply means by which forces can be absorbed when the mold supports 19, 20 are clamped relative to each other.

The mold supports 19, 20 can be braced relative to each other, for example, with the use of a pressure device 54, which, in accordance with one specific embodiment, can be acted upon by a pneumatic pressure medium. The pressure device 54 is arranged between the mold support 20 and the outer mold shell 45. In the closed state of the blowing station 3, pressure application by the pressure device 54 causes the outer mold shell 45 to be pushed away by the mold support 20, thereby resulting in clamping of the inner mold shells 57, 58 relative to each other. In this regard, the clamping forces are at least as great as the expansion forces that act on the inner mold shells 57, 58 during the blow molding of the containers 2.

In accordance with another embodiment of the invention, it is proposed that that levers 51, 53 be designed as toggle mechanisms with a so-called over dead center position. In an embodiment of this type, an additional lateral stop for the levers 51, 53 is provided, against which the levers 51, 53 are pushed during the application of pressure. An embodiment of this type results in self-clamping of the system when pressure is applied and, even when production tolerances are present, reliably prevents forces that could lead to unintended opening of the blowing station 3.

The size of the angle of inclination 43 is preferably in the range of 5-45° and more preferably in the range of 15-30°. An angle of inclination 43 of about 20° has been found to be an optimum compromise between easy handling of the preforms 1 and containers 2 and the greatest possible compactness of the blowing wheel 25 by substantial inward rotatability of one of the mold supports 19, 20.

According to the opened position of the blowing station 3 that is illustrated in FIG. 6, the articulated link 49 was rotated, thereby causing the control lever 51 and thus the mold support 19 to rotate as well. This rotation of the mold support 19 causes it to move past the stationary mold support 20 towards the interior of the blowing wheel 25.

FIG. 6 also illustrates once again that the blowing station 3 is opened towards the front with respect to the direction of rotation 55 of the blowing wheel 25. This helps to achieve the aforementioned optimization of the operation for extracting the blow-molded containers 2.

As an alternative to the arrangement of the blowing station 3 described with reference to the specific embodiments, with an outer mold support 20 that is stationary relative to a blowing wheel 25, it is also possible for the outer mold support 20 to be installed in a movable way and for the inner mold support 19 to be installed in a stationary way. This improves access to the interior of the blowing station but makes the arrangement of the mechanical operating elements more complicated.

In accordance with another embodiment, it is also possible to rotate the entire blowing station 1 before or during the opening and/or closing movements in order to achieve optimum accessibility and compactness. In accordance with another design variant, it is also possible to mount the non-rotatably mounted mold support 20 in a way that allows it to be linearly displaced in order to simplify the feeding and discharging operations.

All of the embodiments explained above can be used for blow molding the preforms 1 into containers 2 with the mouth sections 21 of the preforms 1 oriented vertically upward or vertically downward. Furthermore, the variants of the invention that have been explained here can be combined with all preform heating devices mentioned above.

The invention claimed is:

1. A device for blow molding containers, which has a heating line for heating preforms injection molded from a thermoplastic, plastic material and is provided with a blowing system, which has at least one blowing station arranged on a blowing wheel for shaping the preforms into containers, in which blowing system the blowing station is provided with mold supports for supporting each blow mold segment, and in which blowing system a first mold support is mounted in such a way relative to a second mold support that the first mold support can swivel in relation about a hinge pin, wherein, at least in an opened state of the blowing station (3), a parting plane (41) of the blow mold segments is positioned in such a way that it is directed obliquely forward in the direction of rotation (55) of the blowing wheel (25) at an angle of inclination (43) relative to the radial direction (42) of the blowing wheel (25), wherein the second mold support (20) is rigidly connected with the blowing wheel (25) and is arranged obliquely to the radial reference plane (42), wherein the second mold support (20) that is arranged more towards the outside with respect to the radial direction of the blowing wheel (25) is rigidly connected with the blowing wheel (25), and wherein the angle of inclination (43) has a value in the range of 5-45°, the device further comprising a stretch rod for stretching the preforms.

2. A device in accordance with claim 1, wherein in a closed state, the blowing station (3) is arranged in such a way with the parting plane (41) of the blow mold segments that the parting plane (41) is positioned obliquely relative to the radial reference plane (42) of the blowing wheel (25).

3. A device in accordance with claim 1, wherein an axis of rotation (40) of a moving blow mold segment is arranged essentially vertically.

4. A device in accordance with claim 1, wherein a supporting device for supporting a movable mold support (19) relative to an end support (58) is part of an articulated lever.

5. A device in accordance with claim 1, wherein the blowing station (3) is configured to hold preforms (1) with their mouth sections (21) oriented vertically upward.

6. A device in accordance with claim 1, wherein the blowing station (3) is configured to hold preforms (1) with their mouth sections (21) oriented vertically downward.

7. A device in accordance with claim 1, wherein mold supports (20) that are rigidly connected with the blowing wheel (25) and mold supports (19) that can move relative to the blowing wheel (25) are alternately positioned along the outer periphery (61) of the blowing wheel (25).

8. A device in accordance with claim 1, wherein the blow mold segments are mounted in such a way that they can be clamped relative to each other.

9. A device in accordance with claim 4, wherein the articulated lever is designed as a toggle mechanism.

10. A device in accordance with claim 1, wherein the angle of inclination (43) has a value in the range of 15-30°.

11. A device in accordance with claim 1, wherein the angle of inclination (43) has a value of about 20°.

* * * * *